Feb. 17, 1931.    J. L. CATO    1,792,966
TAIL SUPPORT FOR AIRPLANES
Filed May 28, 1928    2 Sheets-Sheet 1
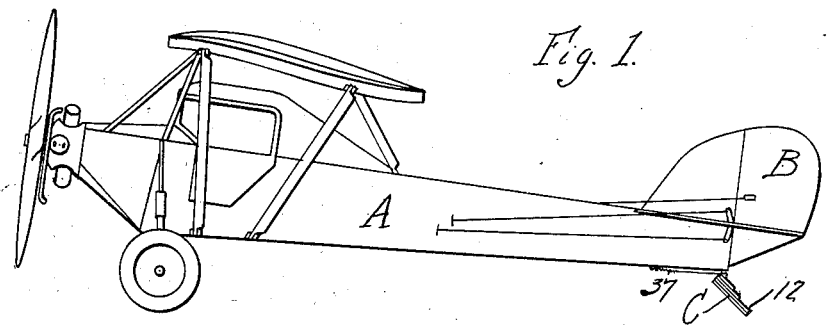
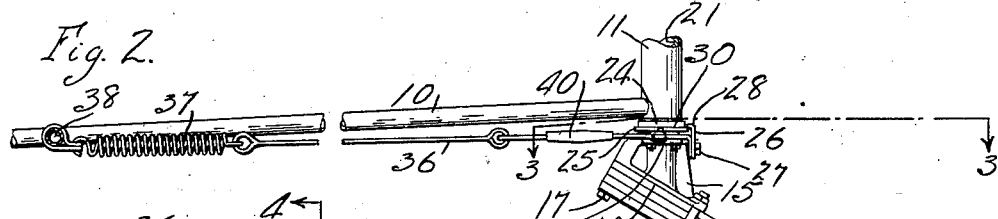
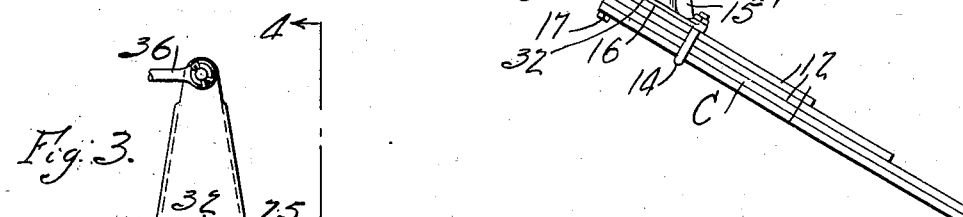
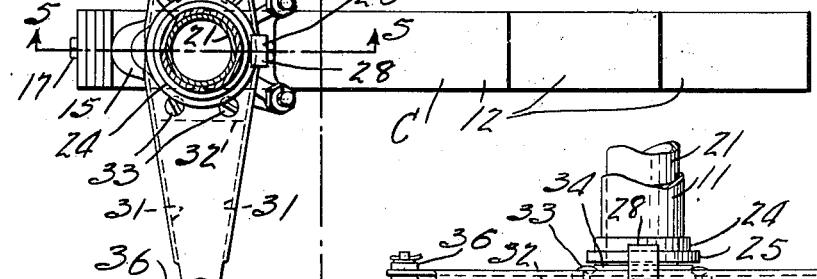
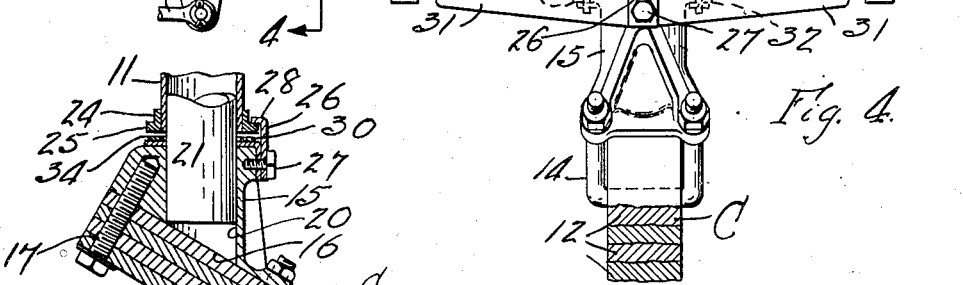
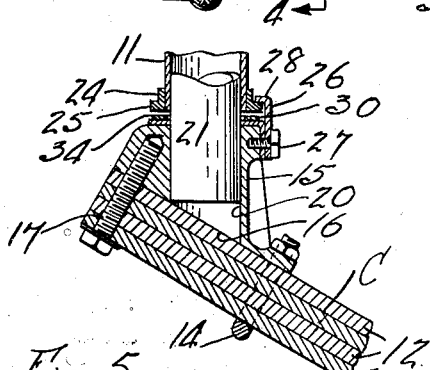
INVENTOR.
Joseph L. Cato
by Parker & Prochnow
ATTORNEYS.

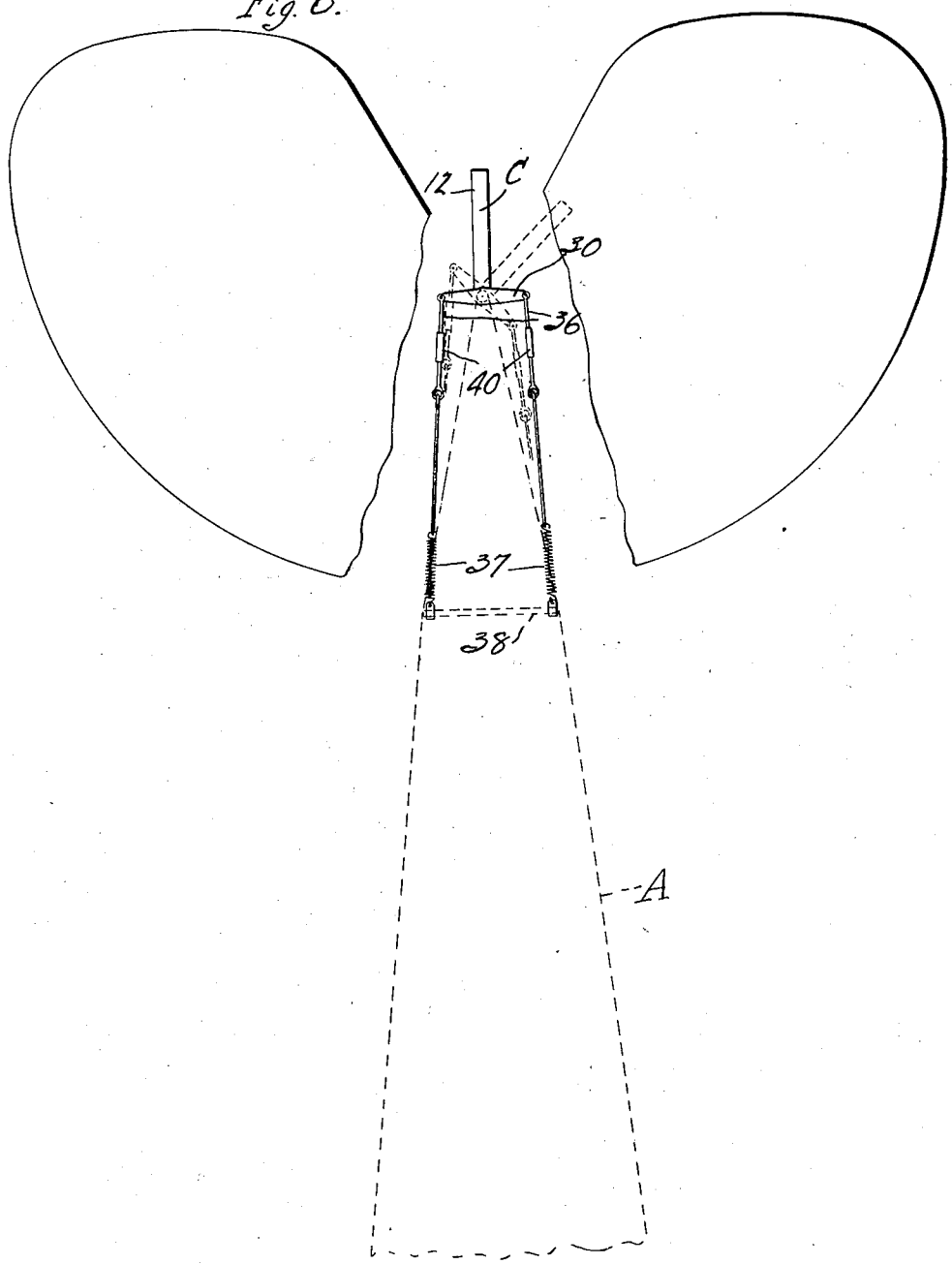

Patented Feb. 17, 1931

1,792,966

UNITED STATES PATENT OFFICE

JOSEPH L. CATO, OF BUFFALO, NEW YORK, ASSIGNOR TO G. ELIAS & BRO., INC., OF BUFFALO, NEW YORK

TAIL SUPPORT FOR AIRPLANES

Application filed May 28, 1928. Serial No. 281,069.

This invention relates to tail supports or skids for airplanes by means of which the tail or rear end of the fuselage of an airplane is supported from the ground, and particularly to the means for mounting the same on an airplane.

The objects of this invention are to provide a tail support or skid with a mounting of improved construction which is pivoted so that it may turn about a substantially upright axis to facilitate the steering of the airplane while on the ground; also to provide a tail support of this kind with springs which normally keep the skid or support in a longitudinal or central position tending to cause the plane to move in a straight line while on the ground, which springs may yield to permit the tail skid to assume different angular positions with reference to the length of the airplane; also to provide a tail support or skid of this kind which is pivoted on the lower end of the stern post of the fuselage; also to improve the construction of tail supports or skids in other respects hereinafter specified.

In the accompanying drawings:

Fig. 1 is a side elevation of an airplane provided with a tail support embodying this invention.

Fig. 2 is a side elevation on an enlarged scale of the tail support showing the same attached to the frame members of the fuselage.

Fig. 3 is a top plan view of the tail support partly in section on line 3—3, Fig. 2.

Fig. 4 is a rear sectional elevation on line 4—4, Fig. 3.

Fig. 5 is a fragmentary longitudinal section thereof, on line 5—5, Fig. 3.

Fig. 6 is a fragmentary top plan view, partly broken away, of the rear end of the fuselage of an airplane having my improved tail support embodied therein.

The airplane shown by way of example in Fig. 1 is illustrated only to show how a tail support embodying my invention may be applied to an airplane and it will be understood that airplanes of any other suitable or desired construction or design may be used in connection with my invention.

A represents the fuselage of the airplane, provided at its rear end with the usual rudder B. The fuselage may be of any suitable or desired construction, that shown in Fig. 2 including at the lower edge of each side a longitudinal frame member 10, the ends of which are secured in a stern post 11 on which the torque bar (not shown) of the rudder B may be mounted in any desired manner.

C represents the tail support or skid which may also be of any suitable or desired construction, that shown being built up of a series of metal spring plates 12 which are secured together near the forward ends by means of a U-shaped shackle 14. The spring plates are secured to a supporting bracket or hub 15 having a lower inclined face 16 against which the spring plates are clamped by means of the shackle 14 and a bolt 17 extending through the tail skid. The particular tail skid C may be replaced by one having one or more ground wheels or rollers if desired, that shown being intended to drag at its lower end on the ground.

The bracket or hub 15 of the tail skid is provided with a tubular bearing aperture or recess 20 into which a pivot member 21 extends. This pivot member, in the form shown, is tubular and the upper portion extends into the hollow tubular stern post 11 of the fuselage and may be secured in place therein, thus forming a pivotal connection about an upright axis between the tail skid and the stern post of the fuselage.

The bracket or hub 15 of the tail skid may be held in operative relation to the pivot member 21 and the stern post of the fuselage in any suitable or desired manner. In the particular construction shown a lower end of the stern post 11 is provided with a collar 24 of substantially L-shaped cross section, having a lower flange 25 extending outwardly therefrom and this collar may be welded or otherwise secured to the stern post. The tail skid bracket or hub 15 is held in operative relation to the stern post by means of a clip or securing member 26, fastened by a bolt or other suitable means 27 to the bracket 15 and having a substantially right angle bend 28 at its upper end which extends over the flange 25 of the collar 24 as is clearly shown in Fig. 5. By means of this construction the bracket 15 of the tail skid may swing about the axis of the stern post and the dropping of the tail skid from the stern post is prevented by the right angle bend 28 of the securing member or clip 26, which remains in engagement with the flange 25 of the collar during all angular positions of the tail skid relative to the fuselage.

Means are preferably provided for normally maintaining the tail skid in a central position in which the airplane will tend to travel in a straight path while on the ground. In the particular construction shown for this purpose the tail skid is provided with a transversely extending bar or control horn 30 which may be rigidly secured thereto in any suitable or desired manner. In the construction shown this control horn is provided at its front and rear edges with downwardly projecting flanges 31, and the middle portion of the rear flanges 31 extends downwardly in contact with the rear face of the tail bracket or hub 15 and is secured thereto by the screw or bolt 27 which holds the retaining member or clip 26 in place.

The bracket or hub 15 of the tail skid may also be provided at opposite sides with flanges or extensions 32 extending laterally therefrom, to which the control bar may be secured by means of bolts 33. A bearing washer 34 may be arranged on the upper face of the control bar, thus being interposed between the control bar and the lower end of the stern post of the fuselage and of the collar 24.

The outer ends of the control horn may be connected by means of links, cables or the like 36, either with the rudder bar or pedals, not shown, in the cockpit of the fuselage, if it is desired to control the positions of the tail skid in accordance with the manipulations of the rudder bar or pedals by the pilot, but preferably the tail skid is automatically and yieldingly held in a substantially central position by means of resilient members or springs 37, the front ends of which are connected to the fuselage of the airplane, for example, to a cross bar 38 connecting the two side frame members 10 of the fuselage frame. Metal coil springs are shown for this purpose but it will be obvious that springs of rubber or other resilient material may be employed if desired.

The links 36 connecting the springs with the ends of the control horn preferably include turn buckles 40 by means of which the lengths of the two links and the pulls exerted by the two springs on the opposite ends of the control horn may be varied in accordance with the tension desired, and the turn buckles can also be adjusted to cause the tail skid to normally assume a longitudinal or central position.

In the operation of the airplane on the ground, the direction of movement is controlled by the rudder B in the usual manner.

When the airplane is moving in the straight line, the tail skid remains in its central or rearwardly extending position. When the rudder is adjusted by causing the airplane to turn from a straight line, the tail skid will swing from its central position toward one side or another in accordance with the direction of movement of the airplane, the spring 37 on one side of the fuselage expanding or stretching while the opposite spring will contract. The tail skid will tend at all times to return to its central position and consequently as soon as the rudder is returned to a position to cause the airplane to move in a straight line, the tail skid will accordingly adjust itself to movement of the airplane in a straight line, thus relieving the pilot of the necessity of controlling the position of the tail skid, and the tail skid normally tends to cause the airplane to move in a straight line while on the ground. The tail skid mounting described also has the advantage that all of the parts of the mounting are so arranged that they can be easily inspected and are readily accessible for adjustment or repairs.

I claim as my invention:

1. In an airplane fuselage having a tubular stern post, the combination of a tail support for the airplane, a bracket on which said tail support is secured, and a pivotal member extending into said stern post and into an aperture in said bracket for pivotally mounting said bracket on said stern post.

2. In an airplane fuselage having a tubular stern post, the combination of a tail support for the airplane, a bracket on which said tail support is secured, a pivotal member extending into said stern post and into an aperture in said bracket for pivotally mounting said bracket on said stern post, and a connection between said bracket and said fuselage for retaining said tail support in a pivotal relation to said stern post.

3. In an airplane fuselage having a tubular stern post, the combination of a tail support, a bracket on which said tail support is secured and having a substantially upright aperture therein, a pivot member extending into said stern post and into said aperture in said bracket for permitting said tail support to swing about the axis of said stern post, an outwardly extending flange formed on the lower end of said stern post, and a clip secured to said bracket and engaging said flange for holding said tail support in operative relation to stern post.

4. The combination with an airplane fuselage having a tubular stern post, of a tail support, a bracket to which said tail support is secured and having an aperture, a pivotal member secured in said stern post and extending into said aperture and forming with said bracket a pivotal mounting for said tail support, and a connection for holding said tail support against movement lengthwise of said pivotal connection.

5. The combination with an airplane fuselage having a tubular stern post, of a tail support, a bracket having an inclined lower face to which said tail support is secured and having an upwardly extending aperture, a pivotal member extending into said aperture and into said tubular stern post for forming a pivotal connection between said tail support and said fuselage, a transversely extending control bar secured to the upper face of said bracket, a collar secured to the lower end of said stern post, a securing clip fastened to said bracket and engaging said collar to hold said tail support in operative relation to said fuselage, and means secured to the ends of said control bar to control the swinging of said tail support relatively to the fuselage.

6. A combination with an airplane fuselage having a tubular stern post, of a tail support, for the airplane, a bracket having an inclined lower face on which one end of said tail support is secured and having an upwardly extending aperture, a pivotal member extending into said aperture and into said tubular stern post for forming a pivotal connection between said fuselage and said tail support, means for holding said tail support in pivotal relation to said pivotal member, a control bar secured to the upper face of said bracket and extending laterally with reference to said tail support, and means secured to the outer ends of said bar for controlling the position of said tail support.

JOSEPH L. CATO.